(12) United States Patent
Uchikura (10) Patent No.: US 8,167,200 B2
(45) Date of Patent: May 1, 2012

(54) AUTHORIZATION VERIFICATION SYSTEM

(76) Inventor: Kenichi Uchikura, Bellevue, WA (US)

( * ) Notice: Subject to any disclaimer, the term of this patent is extended or adjusted under 35 U.S.C. 154(b) by 291 days.

(21) Appl. No.: 12/500,522

(22) Filed: Jul. 9, 2009

(65) Prior Publication Data

US 2011/0006113 A1    Jan. 13, 2011

(51) Int. Cl.
*G06K 5/00* (2006.01)

(52) U.S. Cl. ........... 235/380; 235/379; 705/39; 705/40; 705/44

(58) Field of Classification Search .......... 235/380, 235/379; 705/39, 40, 44
See application file for complete search history.

(56) References Cited

U.S. PATENT DOCUMENTS

| | | | |
|---|---|---|---|
| 5,799,092 | A | 8/1998 | Kristol et al. |
| 6,119,934 | A | 9/2000 | Kolls |
| 6,152,365 | A | 11/2000 | Kolls |
| 6,539,101 | B1 | 3/2003 | Black |
| 6,572,020 | B2 | 6/2003 | Barkan |
| 6,591,249 | B2 | 7/2003 | Zoka |
| 6,755,342 | B1 | 6/2004 | Jordan, Jr. |
| 6,853,984 | B1 | 2/2005 | Wilkes |
| 6,912,312 | B1 | 6/2005 | Milner et al. |
| 6,986,460 | B2 | 1/2006 | Jordan, Jr. |
| 7,209,733 | B2 | 4/2007 | Ortiz et al. |
| 7,516,882 | B2 | 4/2009 | Cucinotta |
| 7,519,557 | B1 | 4/2009 | Lee |
| 7,523,858 | B2 | 4/2009 | Moulton et al. |
| 2002/0038286 | A1 * | 3/2002 | Koren et al. ............. 705/40 |
| 2006/0131390 | A1 * | 6/2006 | Kim ........................ 235/380 |
| 2006/0190412 | A1 | 8/2006 | Ostroff |
| 2006/0207025 | A1 * | 9/2006 | Newkirk et al. .......... 5/600 |
| 2008/0281733 | A1 | 11/2008 | Kubo |
| 2010/0138338 | A1 * | 6/2010 | Hammad et al. .......... 705/39 |
| 2010/0268557 | A1 * | 10/2010 | Faith et al. .............. 705/7 |

FOREIGN PATENT DOCUMENTS

| | | |
|---|---|---|
| KR | 20020000007 | 1/2002 |
| KR | 20040026034 | 3/2004 |

* cited by examiner

*Primary Examiner* — Allyson Trail
(74) *Attorney, Agent, or Firm* — Lowe Graham Jones PLLC (57) ABSTRACT

A transaction card payment authorization system wherein a user presents the transaction card issued by an issuer to a merchant to facilitate payment to the merchant through an acquirer. The system includes an acquirer server in communication with an issuer server through communication with a data control center. A remote terminal, located with the merchant, is in communication with the acquirer. The terminal is configured to forward the transaction amount and user data the card contains through communication with the acquirer, and in turn, to the data control center for authorization. The data control center assigns an identification code to the transaction and forwards the identification code, the transaction amount, and the user data to the issuer for inclusion in records of the transaction. The issuer server initiates a portable communications device communication to the user at a portable communications device.

20 Claims, 5 Drawing Sheets

AUTHORIZATION VERIFICATION SYSTEM

FIELD OF THE INVENTION

The present invention relates generally to a transaction card payment system. It relates in particular to a transaction card payment system including an authorization system for authorizing transactions generated by members of the transaction card payment system.

BACKGROUND OF THE INVENTION

In recent years the use of transaction cards, such as credit cards, as a substitute for cash has substantially increased. Together with the increase in use of credit cards, the burden of protecting a cardholder or an issuer of the card against the consequences of fraudulent use has also substantially increased. Fraudulent card use may include use of a card by a party other than the cardholder.

A credit card transaction system includes the transaction accounting at a control center which includes one or more data processors. Issuers of credit cards generally have direct access to the data control center. Merchant member banks also have direct access to the data control center. A merchant member bank, which may be referred to as an acquirer, is responsible for recruiting merchants to participate in the transaction card payment system. Participating merchants generally have a data gathering terminal for recording or authorizing transactions. The terminal connects the merchant with the acquirer to allow the transaction to ensue.

As an example, a purchase exploiting the transaction card payment system generally proceeds as follows. A cardholder makes a purchase of goods or services from a merchant. The merchant submits a request for payment to the merchant bank and is reimbursed for the cost of the goods or services, minus a service charge. The merchant bank submits a request for payment to the issuer. The issuer, reimburses the merchant bank, debits the cardholder's account and bills the cardholder for the transaction amount.

If, subsequent to the transaction, the issuer does not receive payment for a transaction, either because of a dispute with the cardholder concerning the transaction or because the transaction was fraudulently made, the issuer may demand repayment by the acquirer for all or part of the amount of the original payment made to the acquirer. Such a repayment is generally termed a charge back.

In earlier years the issuer assumed all liability for fraudulent use of cards. Over the past few years, aided by developments in computer capacity and data transmission capacity, the issuer has been able to delegate authorization of a transaction under certain on-line conditions, which can be regulated, to the data control center. Such an authorization system is disclosed in U.S. Pat. No. 4,485,300. In a more recent development, an electronic data acquisition terminal at a merchant's place of business is able to read creditworthiness or risk assessment data from the card itself, for example, from a magnetic stripe on a cardholder's card. By entering data from the card into the data acquisition terminal, authorization of certain purchases below a transaction limit amount, which may be referred to as a floor limit, may be authorized at the point of purchase, i.e. the point of sale. Such an authorization system is described in detail in U.S. Pat. No. 4,734,564.

The more a credit card issuer delegates responsibility for authorization of transactions, the greater the probability that disputes will occur between issuer and acquirer concerning payment rights for transactions above the floor limit which are, or appear to be, fraudulent. Such disputes may arise if a completed transaction record does not have a matching authorization record.

Disputes often occur, for example, when an issuer, having authorized a transaction, receives from an acquirer, a transaction record in the form of a clearing request, i.e., request from an acquirer for payment for the transaction, and one or more descriptive features in the request do not match the description of the transaction in an original authorization record. Matching is not limited, however, to matching transaction amounts. Other data, such as date and time of the transaction, merchant geographical location, and the like, may be included in transaction records. Such data is often used by an issuer, together with cardholder data, for risk assessment or establishing authorization levels.

From time to time, a cardholder may choose to make a purchase that falls outside of the regular recurrent activity for which risk assessment or authorization levels have been established. While generally the pattern information stored in the cardholder data would indicate that someone other than the cardholder is attempting to use the card, it is in the interest of the issuer to authorize the transaction if, indeed, the cardholder is attempting to make a purchase within the limits of the cardholder's credit line. On the other hand, authorizing the transaction if the card is being used fraudulently places a burden on the issuer when the cardholder appropriately disputes the transaction.

A credit card transaction may take place without face-to-face contact, i.e., without presentation of a credit card, for example, when a cardholder orders goods or services by telephone or through the Internet. Yet, it is estimated that about eighty-five percent of all credit card transactions are face-to-face transactions, and that seventy percent of all charge-back disputes occur as a result of these face-to-face transactions. Oddly, however, it is in the face-to-face transactions where the true purchaser is present and able to most readily verify their own identity.

Portable communication devices, such as radios and cellular telephones are becoming ubiquitous as indispensible devices in everyday operations. They include powerful processors and have become very adaptable platforms for numerous applications beyond simple communication. Because of the available power of the processors placed in portable communications devices these days, it is desirable to utilize the portable communication device as a means of authorizing credit card transactions.

There is a need in the art for an improved authorization system which may be implemented using modifications of an existing authorization system.

SUMMARY OF THE INVENTION

A transaction card payment authorization system wherein a user presents the transaction card issued by an issuer to a merchant to facilitate payment to the merchant through an acquirer. The system includes an acquirer server in communication with an issuer server through communication with a data control center. The remote terminal is located with the merchant and is in communication with the acquirer. The merchant terminal is configured to forward the transaction amount and user data the card contains through communication with the acquirer, and in turn, to the data control center for authorization. The data control center assigns an identification code to the transaction and forwards the identification code, the transaction amount, and the user data to the issuer for inclusion in records of the transaction. The issuer server initiates a portable communications device communication to the user by way of a portable communications device.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

The inventive system and method improve upon the existing system and method for authorizing credit card transactions by inserting an additional means and steps of requesting cardholder authorization of transactions through the distinct network that services a portable communications device that the cardholder has identified to the card issuer as belonging to the cardholder.

This description includes regular reference to cellular telephones as the portable communication device. One of ordinary skill in the art of the technology described will recognize on reading the disclosure herein that the technology of the present application may be implemented in any wireless (or wired) device including, for example, cellular telephones, desktop computers, laptop computers, handheld computers, electronic games, portable digital assistants, MP3 players, DVD players, or the like.

This description also includes reference to specific exemplary embodiments. The word "exemplary" is used herein to mean "serving as an example, instance, or illustration."Any embodiment described herein as "exemplary" is not necessarily to be construed as preferred or advantageous over other embodiments. Additionally, all embodiments described herein should be considered exemplary unless otherwise stated.

The word "network" as used herein is set forth to mean one or more conventional or proprietary networks using an appropriate network data transmission protocol. Examples of such networks include, PSTN, LAN, WAN, WiFi, WiMax, Internet, World Wide Web, Ethernet, other wireless networks, and the like. Except where its use is not consistent with the context of the statement, communication as used herein shall mean transfer of information from one recited element to another recited element of the system over a network.

Figure 1:
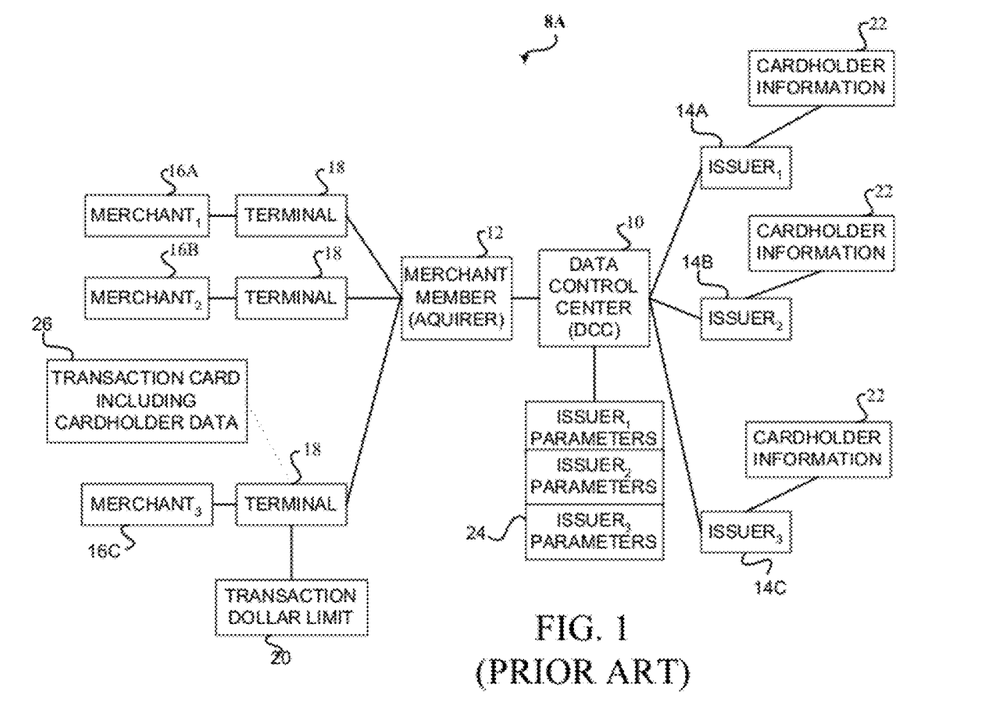
FIG. 1 is a block diagram that depicts the prior art system for authorizing a credit card transaction.

To understand the improvement, it is necessary to present the current method of receiving and authorizing credit card transactions. Turning now to the drawings, FIG. 1 illustrates, in block form, an example of a conventional authorization system 8a to effect transaction card payment. Such a system is described in detail in U.S. Pat. No. 4,734,564, the complete disclosure of which is hereby incorporated herein by reference. A summary of the operation of the system is set forth below to facilitate a description of the present invention.

A data control center 10 forms the hub of the system. An acquirer 12 and a plurality of issuers 14A-14C are in communication by network through the data control center 10. The issuers 14A-14C and an acquirer 12 may thus communicate or transmit records through the data control center 10. For clarity, the data control center 10 is shown in FIG. 1 as a single entity. The data control center 10 however may include, either at a central or base location, one, two or more processors or computers each having a different function in the system or a distributed network of computers providing some redundancy. Additionally, there may be a distributed plurality of remote data control centers at diverse geographic locations. The remote data control centers may be located, by way of nonlimiting example, in one or more cities in the United States or in a city in a foreign country.

The acquirer 12 is a merchant member bank of the system, and is responsible for recruiting merchants into the system and maintaining credit service for those merchants. The merchants 16A-16C are each in operative communication with the acquirer 12, each using at least one remote merchant terminal 18, usually located in the merchant's premises. The remote merchant terminal 18 generally consists of a microprocessor (not shown), a memory that includes both random access and read only memory (not shown), though, recently, both memory types are included within a flash memory that houses both a changeable firmware as ROM and a capacity for storage of RAM-type data. The merchant terminal 18 may suitably use the microprocessor for applying relevant data to fix a transaction dollar limit or floor limit 20. Transaction amounts in excess of the floor limit 20 must be authorized by the data control center 10 or by the credit card issuer 14C. The data that may be readily available to the merchant terminal 18 for establishing the floor limit 20 includes such cardholder information 22, either by virtue of the embedment of the relevant data in the card or by communication with the data control center 10 working in concert with the issuers 14A-14C.

As will be appreciated, the system may include significantly more than the three merchants shown in FIG. 1, and more than one acquirer, for example, acquirers 12A and 12B. For clarity of explanation, however, the system is further described in terms of only one such merchant terminal at only one merchant location.

Residing on the opposite side of the data control center 10, each issuer 14A-14C maintains a server (shown here as issuer 14), which may be used for evaluating transaction authorization requests. Just as this application uses "acquirer" to refer to both the institution of a merchant bank and its server as the acquirer, the term "issuer" will refer interchangeably to the issuing bank and to its server and both will be denoted by the same reference numeral throughout the following description. The issuer's server 14C may also be used for maintaining cardholder accounts and other cardholder information 22 such as payment records, frequency of card use and the like. Such cardholder information 22 may be used as relevant data for computing cardholder creditworthiness and risk assessment information.

The data control center 10 may include files 24 containing a set of parameters established by each issuer in the system. Files 24 are used to determine if a transaction is of a nature to be authorized by the data control center, or must the request be forwarded to the issuer 14C for authorization.

When a cardholder desires to make a purchase from the merchant 16C, the amount of the desired transaction is entered into the merchant terminal 18 together with cardholder data read from a transaction card 26, such as a credit card. If the merchant terminal 18 determines from the data that the desired transaction amount is in excess of the floor limit 20, a request for authorization is forwarded. The authorization request is first forwarded to the acquirer 12. The authorization request is then forwarded by the acquirer 12 to the data control center 10 where it may be authorized directly or passed to the issuer 14C for authorization. If the transaction is authorized by the issuer 14C, the authorization is recorded and adjustments are made to the cardholder's account and to the cardholder's credit availability or open-to-buy. If the transaction is authorized, either by the data control center 10 or by the issuer 14C, authorization is forwarded by the data control center 10 to the merchant 16C through the acquirer 12.

Having received authorization, the merchant 16C may complete the transaction and make a record of the transaction, including at least the transaction amount, and other data, for example, the date of the transaction.

As discussed above, the sequence of operations for reimbursing the merchant 16C for the transaction may proceed generally as follows: The merchant 16 submits a record of the completed transaction to the acquirer 12. The acquirer 12 credits the merchant's account for the cost of goods sold minus the merchant discount and service fee. The acquirer 12 submits a clearing request for payment to the issuer 14C via the data control center 10. The issuer 14C compares the clearing request with the authorization, i.e. the issuer 14C compares a record of the completed transaction with a record of the authorization. If certain data in the records, for example the amount of the transaction, match within predetermined tolerance limits, the transaction amount is forwarded to the acquirer 12, the cardholder's account is adjusted according to the transaction amount, the issuer bills the cardholder and replenishes the cardholder's credit.

Although the majority of the above described procedure is generally accomplished by electronic data transfer, sufficient opportunity for erroneous data entry or inadvertent record alteration exists at an acquirer location, and particularly at a merchant location. This may produce transaction records and authorization records which do not match within the predetermined tolerances established by an issuer. These mismatching records lead to chargebacks to acquirers, and payment disputes which place a costly burden on the system.

In accord with the teachings of U.S. Pat. No. 5,384,449, incorporated herein by this reference, the data control center assigns a unique identifying code to each transaction, at the time authorization is requested. That code is then affixed to all subsequently generated records of the transaction. The identification code may be simply a number, or a combination of letters, numbers, or symbols.

The conventional system 8a of credit card authorization, such as the system of FIG. 1 may be greatly improved to an inventive system 8b which allows authorization while the merchant 16 has the person asserting themselves to be the cardholder in the merchant's presence. Advantageously, such a system allows the merchant 16 to seek the help of authorities in situations when the lack of such authorization suggests to the merchant 16 that the use of the card is fraudulent.

Figure 2:
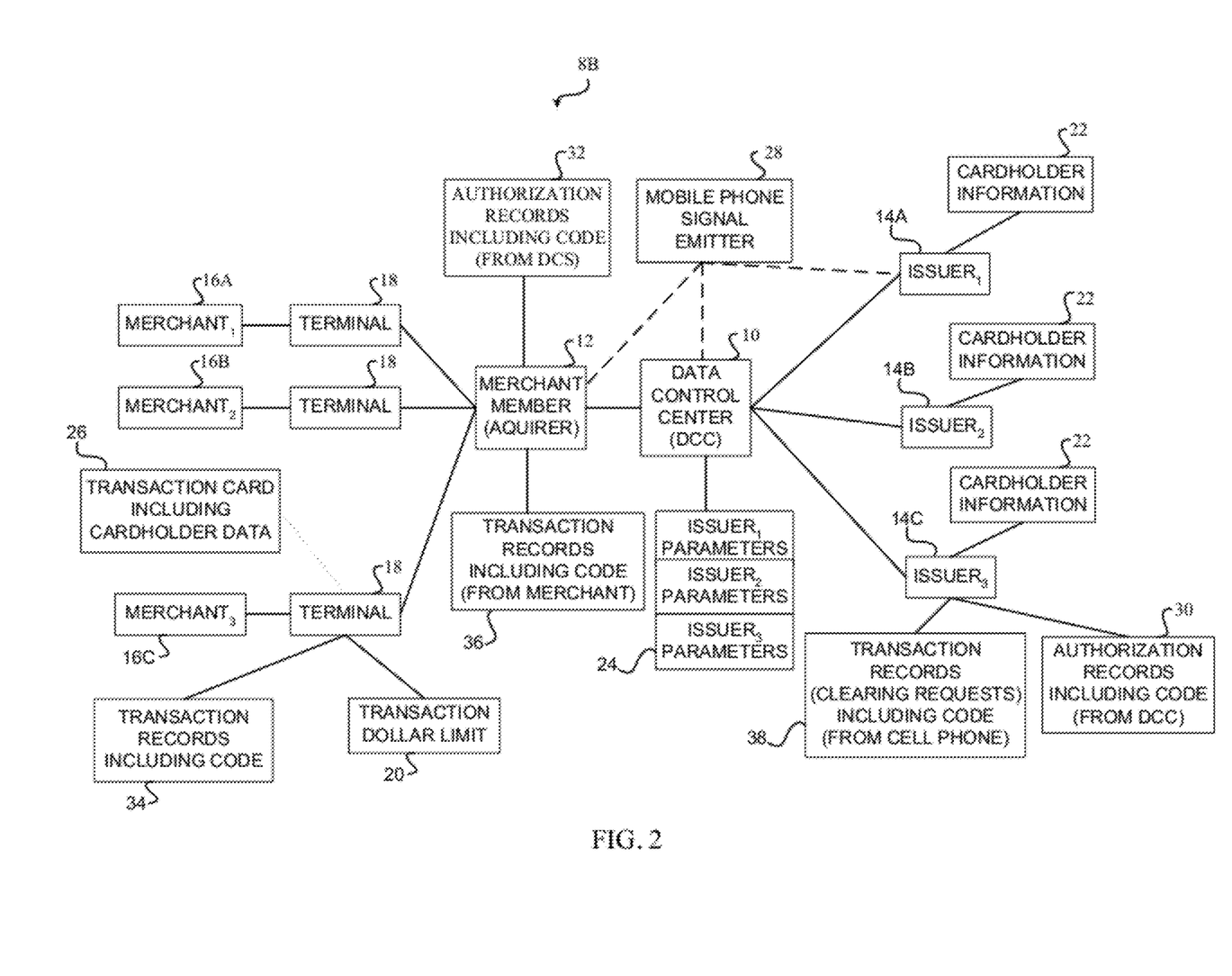
FIG. 2 is a block diagram that depicts an improved system for authorizing a credit card transaction.

In FIG. 2, as stated above, when a person asserting themselves to be a cardholder desires to make a purchase from one of the merchants 16C, by way of nonlimiting example, the amount of the desired transaction is entered into the merchant terminal 18 together with cardholder data read from a transaction card 26, such as a credit card. For purposes of explanation, all elements of FIG. 1 are repeated and except to the extent set forth herein, their purpose and function is the same as set forth with respect to FIG. 1. Improvements to the system of FIG. 1 are illustrated in block form in FIG. 2. Here, a portable communications device signal emitter 28 is added to the data control center 10, the acquirer 12, or to one of the several issuers 14A-C. Operation of the portable communications device signal emitter 28 is triggered when an authorization request from the acquirer 12 is received by the data control center 10. As already discussed, the data control center 10 may include more than one processor. Accordingly even though, for clarity, portable communications device signal emitter 28 is shown as a single entity, the facility may be distributed or may exist in selected processors or in parallel processing of tasks, in all processors in the data control center 10.

In a first embodiment of the invention, upon receiving the authorization request, the data control center 10 sends the request to the issuer, in this case the issuer 14A, in response to which, the issuer 14A, along with its customary regimen for authorization, will initiate a signal to the cardholder's portable communications device. The issuer 14A will retrieve the cardholder information 22 including the proper SMS routing number, and using that SMS routing number, initiates an SMS transmission requesting further authorization from the cardholder. By way of nonlimiting example, this request for authorization might be by SMS text message indicating the merchant and amount of the transaction that is currently the subject of the request for authorization. In this fashion, if the transaction is not one initiated by the cardholder, then the cardholder will not suitably respond to the SMS text message and the authorization will not be granted. Only in the instance of a cardholder approving the transaction will authorization be sent back from the issuer 14A through the data control center 10 and on to the merchant terminal 18 through the acquirer 12, thereby completing the authorization.

In an alternative embodiment, rather than exploiting the SMS texting capability of the cardholder's portable communications device, the inventive system 8b initiates a portable communications device call by automated dialing, the cardholder's information 22 having been drawn by the issuer 14A to facilitate the initiation of the call to the portable communications device. Upon receiving a suitable response indicating a connection to the cardholder, an aural message is transmitted to the cardholder indicating the merchant and amount of the transaction that is the subject of the authorization request. The aural message includes a request for either a vocal or touch tone response to the message that will indicate the cardholder's intent to authorize the transaction. As with the receipt of an appropriate SMS response, the issuer 14A will, upon completion of the remainder of its conventional authorization regimen, initiate an authorization of the transaction.

In a third nonlimiting embodiment of the invention, an email is sent to the cardholder. The email requests a specific response to the email message in order to complete the authorization regimen as with the SMS text and telephone call embodiments of the inventive system 8b for requesting authorization. Upon receipt of the response according to the email message, the issuer completes the conventional authorization system and generates an authorization signal according to its conventional system 8a.

By any of the above-described transmissions to the cardholder's portable communications device and respondent receipt of cardholder acknowledgement according to the prescribed regimen, the portable communications device signal emitter 28 generates an identification code to the transaction to indicate receipt of a suitable acknowledgement of the request to authorize the transaction that the portable communications device signal emitter 28 sent to the cardholder reporting the transaction. The generated identification code is forwarded together with the requested transaction amount to the issuer 14C, where it may be filed as an authorization record in authorization record files 30. A transaction code and amount are transmitted to the issuer 14C, even if the transaction is authorized at the data control center 10. The identification code is also transmitted to the acquirer 12 by the data control center 10. Authorization record files 32 including the identification code may be maintained by an acquirer. The identification code may also be forwarded by the acquirer 12 to the merchant 16C. The merchant 16C may store the transaction code together with other transaction data including the amount in completed transaction record files 34 in the merchant terminal 18. Such files would usually be stored until the end of the business day and then forwarded as a batch to the acquirer 12 for payment.

As indicated above, the inventive system 8b does not require that the issuer 14C necessarily, be the server that seeks the authorization from the cardholder, though, in most cases because the contract with the cardholder is between cardholder and issuer 14C, the issuer will often be the server from which the portable communications device signal issues. In alternate embodiments, the data control center 10 might be connected to the portable communications device signal emitter 28 and may issue the authorization emission in accord with the cardholder information 22 the issuer 14C provides at the time of the transaction. Likewise, the acquirer 12 might also be connected to the portable communications device signal emitter 28 and might, by means of information contained on the transaction card 26 itself, connect to the portable communications device signal emitter 28 in order to secure the cardholder. In any of these three embodiments, the function of the portable communications device signal emitter 28 remains the same, to conduct an authorizing interaction with the cardholder by means of the cardholder's portable communications device.

In the event of a dispute with the cardholder, it is advantageous to have a record of the authorizing interaction with the cardholder by means of the cardholder's portable communications device. As discussed above, an identification code may simply be a number, or a combination of letters and numbers. It is important however that each identification code is unique, i.e. that no possibility exists to assign the same number to different transactions. One method of generating a unique identification code, in the form of a number, 23 characters long, is set forth below. A major transaction card payment system may be required to process up to about ten million transactions per day. A code may be generated by one, two, or more computers in a data control center in which the transactions are processed. A computer typically includes a capability to generate a date and time of day.

Accordingly, a computer processor in the data control center 10 generates an identification number. An electronic serial number (ESN) is embedded in a wireless phone by the manufacturer. Each time a call is placed, the ESN is automatically transmitted to the base station so the wireless carrier's mobile switching office can check the call's validity. The ESN cannot easily be altered in the field. A mobile identification number (MIN) uniquely identifies a mobile unit within a wireless carrier's network. The MIN often can be dialed from other wireless or wireline networks. The ESN differs from the MIN, which is the wireless carrier's identifier for a phone in the network, and unlike the ESN, can be changed in the field. Portable communications device carriers periodically and regularly check MINs and ESNs to help prevent fraud on the carrier. As such, these numbers are presumed to be reliable. Concatenating either one or both of these numbers to a date time stamp assigned to the authorizing interaction with the cardholder by means of the cardholder's portable communications device to create an authorization identification code, would, optionally, further identify and verify the use of the cardholder's own portable communications device as the authorizing instrument and, thus, allow more rapid resolution of disputes. Thus the authorization identification code is advantageously stored with the transaction data at the issuer 14C.

The acquirer 12 may also maintain transaction record files 36 for storing transaction records, received from several merchants, until it is convenient to match them with authorization records stored in files 32. Clearing requests (i.e. acquirer's transaction records) from the acquirer 12 to the issuer 14C, may be stored in files 38 by the issuer 14C, i.e. until it is convenient to match them against authorization records in files 30.

The authorization identification code may additionally include a check digit. The check digit is generated by an algorithm maintained at the data control center 10. The algorithm mathematically manipulates characters in the code representative of code generating systems, date, time, and sequence to produce a single characteristic check digit. All records including an identification code, submitted to the center have system time, date, and sequence characters in the code manipulated by the algorithm to produce a check digit for comparison with the check digit in the ID code.

Such a number assignment method is readily implemented on computers currently used for transaction card data processing. The above described number assignment method yields a unique transaction number for each transaction processed, even over decades of system operation.

Figure 3:
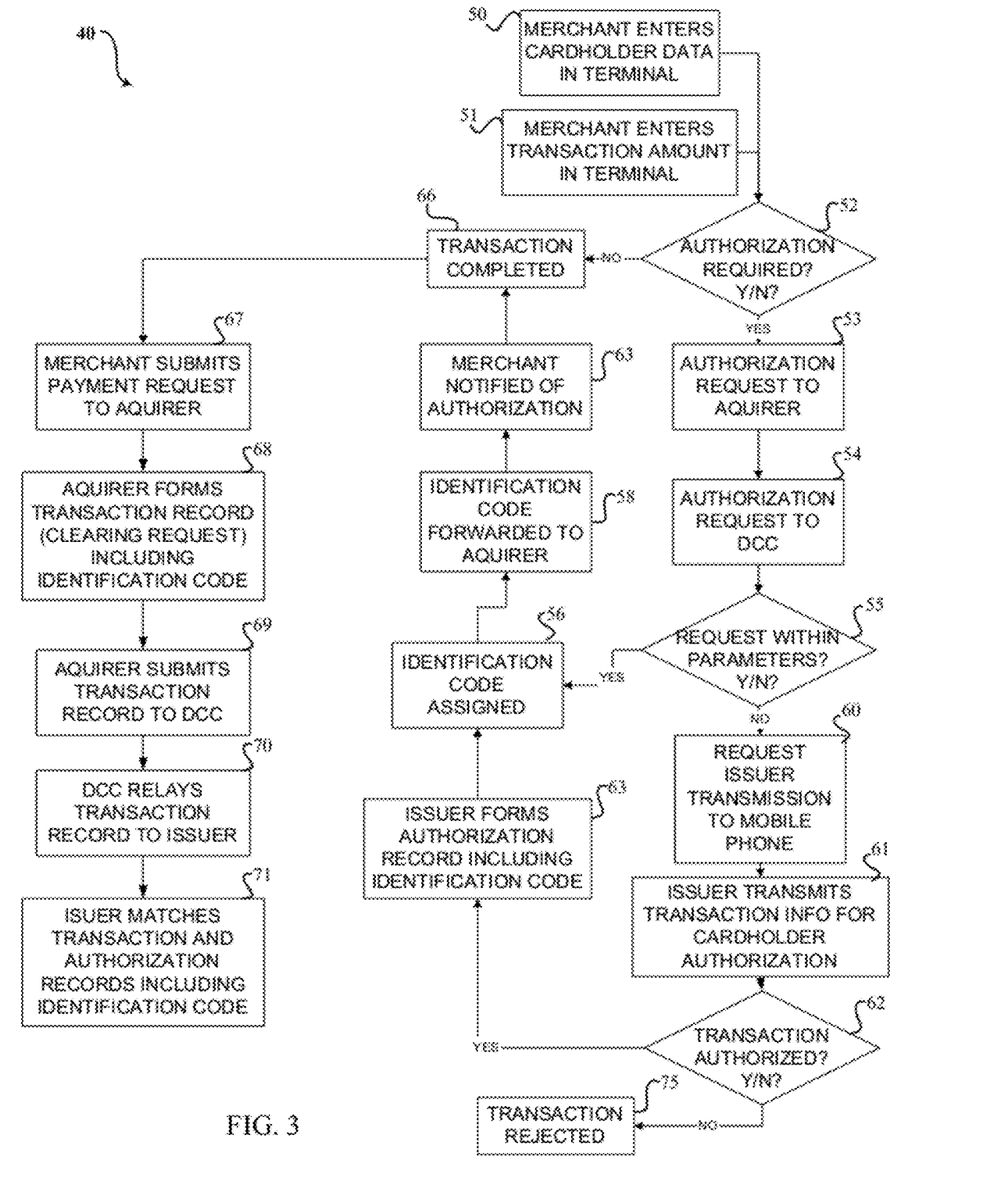
FIG. 3 is a flow chart for authorizing a credit card transaction according to the inventive method.

Continuing now with a detailed description of a matching method 40 for transaction approval utilizing the inventive system earlier described, one embodiment of the method is illustrated in flow chart form in FIG. 3.

When a cardholder wishes to make a purchase (transaction), a merchant reads cardholder data from a cardholder's transaction card into a data gathering merchant terminal (Block 50). The merchant then enters the amount of the desired transaction into the data gathering merchant terminal (Block 51). The cardholder data may be used to establish a transaction dollar limit for the cardholder. If the amount of the desired transaction exceeds this limit (Block 52), transaction authorization must be requested to allow the merchant to book the transaction.

When authorization is requested, a transaction authorization request is forwarded from the merchant terminal to an acquirer (Block 53). The acquirer forwards the request to a data control center (Block 54).

In a strictly conventional method, the data control center evaluates the request according to financial parameters established by an issuer of the transaction card. If the transaction request is within the parameters (Block 55), the data control center assigns an identification code to the transaction (Block 56). Because, in this iteration, no contact with the cardholder was necessary, either an authorization code padded with zeros or some other distinctive authorization code that is readily recognized as indicative of a transaction without cardholder authorization is embedded in the transaction code. In the inventive method, departures from conventional patterns of transactions, unusual locations of merchants, or other such designatable parameters indicate that a personal authorization by the cardholder is desirable. Thus, at Block 55, the request is found to be not within parameters and on that basis submits a request for cardholder authorization to the issuer (Block 60).

The data control center forwards the amount of the authorization to the issuer of the credit card together with the identification code (Block 57) and also forwards the authorization code to the acquirer (Block 58). In response to the request, the issuer transmits a message by one of SMS text, email, or voice to the cardholder requesting authorization. If a negative response or a timeout occurs in response to the request (Block 62), authorization is denied (Block 75). In an alternative embodiment, the issuer will send a message to the merchant through the data center to the merchant terminal indicating a difficulty, and suggesting to the merchant alternate means of establishing the identity of the cardholder such as requesting the opportunity to view a picture identification card, by way of nonlimiting example.

Where the cardholder does respond to the transmission at Block 62, the issuer generates the authorization code indicative of both the time and the telephone instrument (either by ESN or MIN or both) used for authorization (Block 63).

The issuer makes a record of the authorization including the generated authorization code and a transaction identification code as well as the requested amount to form an authorization record (Block 56). This differs from Block 56 as described above only in that the record includes an actual authorization code rather than an authorization code padded with zeros or some other distinctive authorization code that is readily recognized as indicative of a transaction without cardholder authorization. When the coding of the transaction authorization is complete, the merchant is notified through the merchant terminal that the transaction is authorized (Block 63). To accomplish this, the issuer notifies the data control center and the data control center, in turn notifies the acquirer. The acquirer then forwards the authorization to the merchant (Block 63).

After the merchant has completed the transaction (Block 66), the merchant forwards a request for payment to the acquirer (Block 67). The acquirer forms a first transaction record including the identification code (Block 68) and forwards this record to the issuer, via the data control center (Blocks 69 and 70). The issuer may then match the acquirer's transaction record with the first authorization record by comparing, i.e. matching, the transaction code in each of the records (Block 71).

Figure 4:
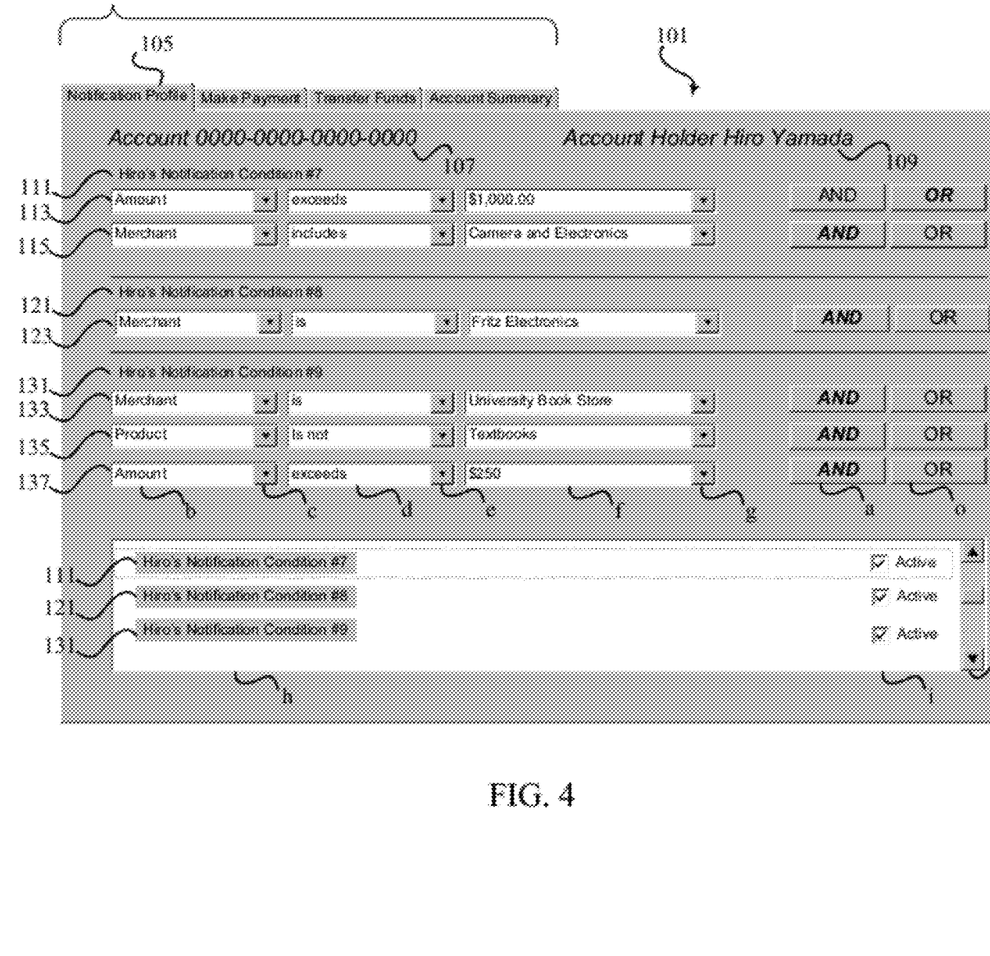
FIG. 4 is an exemplary active page interface for the system to allow maintenance of a personal profile.

Referring to FIG. 4, another nonlimiting embodiment is shown. As stated above the inventive method authorization is a response to departures from conventional patterns of transactions, unusual locations of merchants, or other such designatable parameters indicate that a personal authorization by the cardholder is desirable. Thus, at Block 55 (FIG. 3), the request is found to be not within parameters and on that basis submits a request for cardholder authorization to the issuer (Block 60, FIG. 3). Because of the nature of the profile, such authorization need not be limited solely to such occurrences. In fact, there is no reason why a cardholder might not choose further situations to require such authorization requests to the portable communications device to occur before a transaction can be authorized.

For purposes of this nonlimiting example, a fictitious mother and son are presented, Mayumi Yamada, the mother and Hiro Yamada, her son, the holder. Hiro is at college and to support his studies there, Mayumi applies for a credit card in Hiro's name based upon her credit and her relation with the issuer. For the purposes of this nonlimiting example, the issuer recognizes Mayumi as the account owner and that the card is issued bearing Hiro's name as holder of the card.

Before turning the card over to Hiro, Mayumi logs on to a website that the issuer supplies for her review of the account. On that site, she navigates to a notification profile 101 shown in FIG. 4. On the notification profile, she can compose and add further events that would trigger the inventive request for authorization to be sent to her portable communications device. Shown here are the account number 107 and the name of the card holder 109 to allow Mayumi to recognize the account. Also shown in this nonlimiting exemplary profile 101 are three nonlimiting examples of such events which are identified as "Hiro's Notification Condition #7" 111, "Hiro's Notification Condition #8" 121, and "Hiro's Notification Condition #9" 131.

Mayumi knows that Hiro has a weakness for gadgets such as cameras and consumer electronics. While she knows that she wishes to limit Hiro's purchases both in scope and in nature. She does not wish to have him purchase expensive electronics nor to purchase many or very expensive items without having first discussed the matter with her. She wants to make certain that she will be notified by a request for authorization in such instances.

For that reason, she sets up "Hiro's Notification Condition #7" 111 by use of a series of drop down menus present on the profile 101. At a subject drop down menu 113*b*, Mayumi selects the "amount" subject from the drop down 113*c* to indicate that this condition relates to the amount of the transaction for which authorization is sought. At a verb drop down menu 113*d*, Mayumi selects by manipulation of a drop down 113*e*, the verb "exceeds" that together with the "amount" in the drop down menu 113*b*, means that she wishes to be informed when the amount of the transaction exceeds an amount that she will set by means of a drop down menu 113*f* which she manipulates by means of the drop down 113*g* to indicate "$1,000." Because Mayumi wishes to make this condition to be applicable to all transactions she selects an "OR" radio button 113*o* rather than an "AND" radio button 113*a* to indicate that she also wants to be notified especially of a particular type of transaction.

At a drop down menu 115*b*, Mayumi selects the "Merchant" subject by clicking on a drop down 115*c*, selects the "includes" verb at a drop down menu 115*d*, and also selects the "camera and electronics" genre at a drop down menu 115*f* by using the drop down 115*g*, thereby to indicate that she also wants to be notified whenever the merchant is a dealer of products that fit into either of Hiro's known weaknesses, "cameras and electronics." In recognition of this additional condition on authorization, the issuer will now trigger the inventive authorization process whenever a transaction meets these conditions and authorization will not occur without Mayumi's express consent transmitted from her portable communications device.

Mayumi sets up an additional condition labeled "Hiro's Notification Condition #8" 121. In this nonlimiting example a fictitious vendor "Fritz Electronics" has previously sold Hiro equipment that was defective and unacceptable. For purposes of this example, Fritz did not resolve the transaction in a manner that was satisfactory to Mayumi. She now wishes to prevent Hiro from purchasing equipment from Fritz unless he first discusses the necessity of the transaction with her. To that end, she selects the "merchant" option on a drop down menu 123*b* using the drop down 123*c*, the "is" verb at a drop down menu 123*d* using a drop down 123*e*, and the name "Fritz Electronics" at a drop down menu 123*f* using the drop down 123*g*. Because there is no need for an additional condition she does not activate either of the radio buttons 123*a* or 123*o* and does not, thereby trigger generation of an additional trigger line. Thus, Mayumi is notified anytime the merchant for a subject transaction is Fritz Electronics and she will have to authorize the transaction using her portable communications device in response to a request transmitted to her according to the inventive method.

Mayumi constructs "Hiro's Notification Condition #9" 131 in order to assure that when Hiro is at the University Book Store, his purchases are generally limited to items necessary for his studies and not for "booster" merchandise and other such temptations. To that end, Mayumi uses a drop down 133c to populate a drop down menu 133b to read "merchant", a drop down 133e to populate a verb drop down menu with "is," and a drop down 133g to populate a drop down menu 133g to identify the "University Book Store." Clicking on an AND radio button 133a, Mayumi triggers the generation of a second conditional line 135. Within the second conditional line, Mayumi identifies "Product" in a drop down menu 135b, using a drop down 135c, uses a drop down 135e to populate a verb drop down menu 135d with "is not," and, using a drop down 135g selects the identifier "textbooks" to populate the drop down menu 135f. Clicking an AND radio button 135a, Mayumi triggers the generation of a third conditional line 137. There she identifies Amount in a drop down menu 137b using a drop down 137c, selects the verb "exceeds" to populate a verb drop down menu 137d using the drop down 137e, and uses a drop down 137g to populate an object drop down 137f.

In the profile, a scroll down 140 allows Mayumi to review the several conditions that she has placed upon the administration of Hiro's card. Accompanying each of the several conditions "Hiro's Notification Condition #7" 111, "Hiro's Notification Condition #8" 121, and "Hiro's Notification Condition #9" 131 in column h there are also corresponding check boxes 111i, 121i, and 131i to allow the intermittent use of the condition. For example, should Mayumi decide that "Hiro's Notification Condition #7" 111 is not appropriate during a Christmas/New Year holiday season, she may choose to deactivate the condition by unchecking the "Active" check box 111i thereby removing that condition on the authorization of the transaction by the issuer. In such a manner, Mayumi has the ability to manage her profile.

Figure 5:
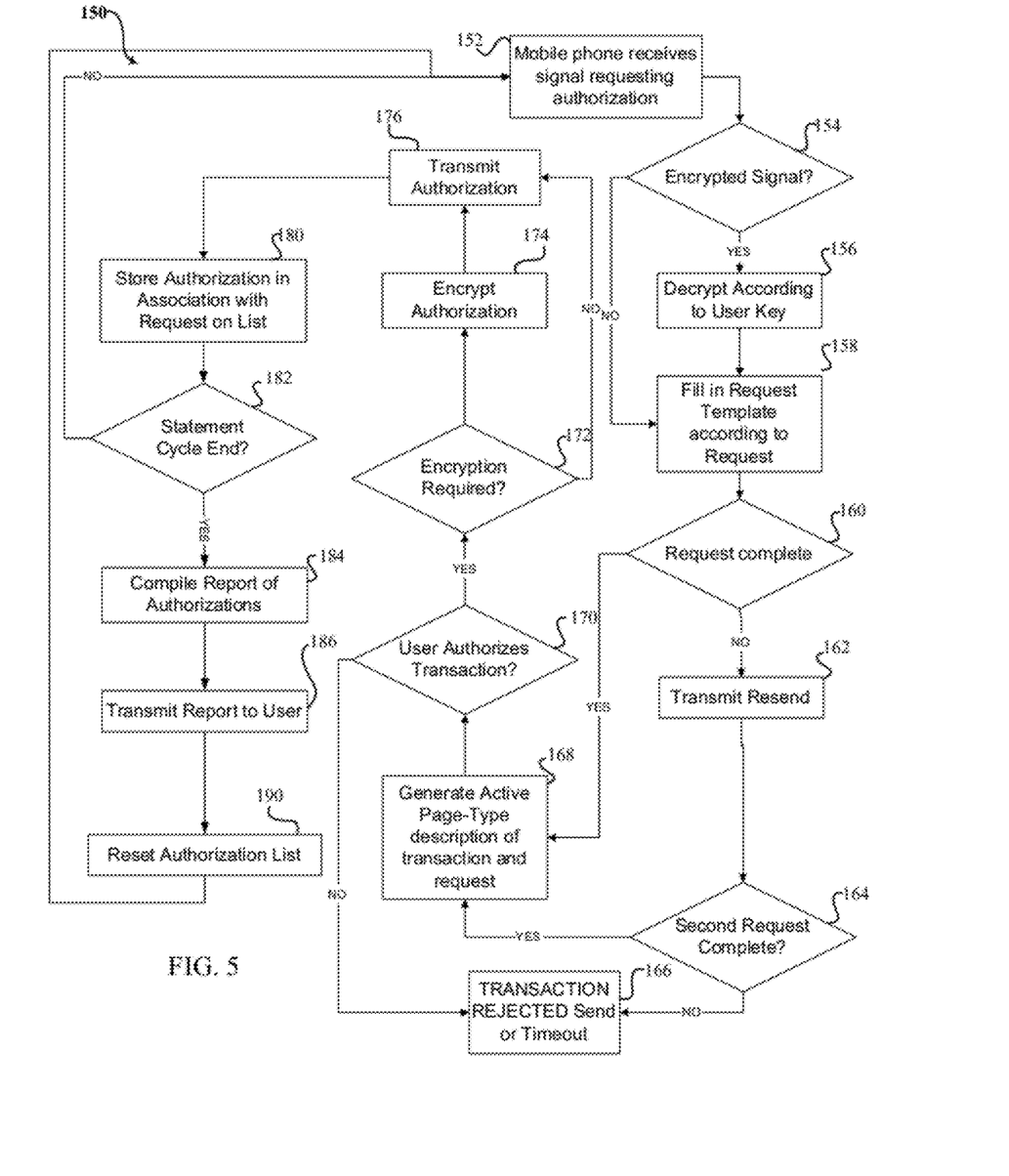
FIG. 5 is a flow chart for a software module resident on a portable communications device.

Referring to FIG. 5, a method 150 for a portable communications device receiving an authorization request from an issuer for a card holder transaction is set forth. In many instances, this method will be set forth in the form of an application such as those available for use on the iPhone™ or Blackberry™ devices. After being invoked by any means suitable to the portable communications device, the method 150 commences at a block 152 when the portable communications device receives the transmission from the issuer sent at the block 61 (FIG. 3). If the signal is found to be encrypted at a block 154 it is suitably decrypted using a key for this user, once the signal is in an unencrypted state, at a block 158, the information in the signal is used to complete a request template to assure that there is sufficient information to formulate and present to the user. If, at a block 160, the request is found to be incomplete, the portable communications device sends a retransmission resend signal at a block 162. At a block 164, the re-sent request is compared to the template to determine whether the request is complete for presentation to the user. The number of times that this verification as set forth in blocks 160 through 164 may occur is not limited to two requests but may be designatable by the issuer. The essence of the invention is not in any way limited by the number of iterations of this send and request resend portion of the method 150. In the event that the designated number is exhausted, then at a block 166, the transaction is determined to be unauthorized and then the issuer declines the transaction.

If, in interaction with a user interface on the portable communications device the user authorizes the transaction at a block 170, an authorization message is suitably formatted. Based upon issuer guidelines, such a transmission may be encrypted at a block 174. At a block 176, the formatted authorization message is transmitted to the user.

While not necessary, the portable communications device may, optionally, play a larger role in the method 150. Optionally, within the portable communications device, a record of the transmission and the message is associated with the original request received at the block 152 for storage within the portable communications device at a block 180. At a block 182, when the credit card or debit card statement cycle is noted to have come to a close, the portable communications device compiles, at a block 184, a report of the authorizations that have occurred over the course of the statement cycle. At a block 186, this may be sent by email or other such communication to the user. Finally, the authorization list is reset to begin the next cycle.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A software module executed by a processor, or in a combination of the two, may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The present invention has been described in terms of a preferred embodiment and an alternate embodiment. The invention, however, is not limited to the embodiments described and depicted. Rather, the scope of the invention is defined by the appended claims.

The embodiments of the invention in which an exclusive property or privilege is claimed are defined as follows:

1. A transaction card payment authorization system wherein a user presents the transaction card issued by an issuer to a merchant to facilitate payment to the merchant through an acquirer, the system comprising:

an acquirer server in communication with an issuer server, the communication occurring through a data control center;

a remote merchant terminal located with the merchant and in communication with the acquirer, the merchant terminal configured to forward the transaction amount and user data the card contains through communication with the acquirer server, and in turn, to the data control center for authorization;

the data control center to assign an identification code representative of the transaction to the transaction and to forward the identification code, the transaction amount, and the user data to the issuer server for inclusion in records of the transaction; and the issuer server for initiating a portable communications device communication to the user at a portable communications device the user has previously identified to the issuer.

2. The system of claim 1 wherein the communication is by one of the group including aural message, email message and text message.

3. The system of claim 1 wherein the issuer server is further configured to receive a user initiated authorization of a transaction from the portable communications device.

4. The system of claim 1, wherein the issuer server is configured for selectively initiating a portable communications device communication to the user at a portable communications device the user has previously identified to the issuer, based upon a user profile.

5. The system of claim 4, wherein the user may add events for initiating a portable communications device communication to the user to the user profile.

6. The system of claim 1, wherein the portable communications device initiates a procedure for displaying the transaction amount and the user data at the portable communications device communication when it is received at the portable communications device.

7. A transaction card payment authorization system wherein a user presents the transaction card issued by an issuer to a merchant to facilitate payment to the merchant through an acquirer, the system comprising:

an issuer server, having resident upon it user information for evaluating a transaction, the user information including a portable communications device number the user for purposes of authorization of transactions;

a data control center for receiving information regarding authorizing the transaction from a merchant terminal, the information including a user identifier information, merchant identification information, and a transaction amount, the data control center assigning a unique identification code to the transaction, upon receipt, which the data control center communicates to the issuer server for authorization; and a portable communications device communications link for communicating a request to the portable communications device at the portable communications device number, the request configured to inform the user of the merchant identification information and the amount and including an initiation to authorize the transaction.

8. The system of claim 7 wherein the portable communications device communications link for communicating the request is selected from the group consisting of SMS Text Messaging, aural telephone message, and email notification.

9. The system of claim 7 wherein the portable communications device communications link for communicating the request further includes means receiving the authorization and for storing an authorization record reflective of the transaction.

10. The system of claim 9 wherein the issuer server communicates the authorization record to the data control center to cause the data control center to send an authorization of the transaction to the merchant terminal.

11. The system of claim 9 wherein the authorization record is configured to omit the portable communications device number.

12. The system of claim 9 wherein the remote merchant terminal further includes means for storing the unique identification code and the authorization record together with other data concerning the transaction, for reconciling at the time of crediting the merchant for the transaction.

13. The system of claim 9, wherein the a portable communications device communications link for is configured for selectively communicating a request to the portable communications device at the portable communications device number, the request configured to inform the user of the merchant identification information and the amount and including an initiation to authorize the transaction based upon a user profile stored at the issuer server.

14. The system of claim 13, wherein the user may edit the profile stored at the issuer server.

15. In a transaction card payment system including a transaction card carrying cardholder identification data, a terminal located at a point of the transaction for reading the cardholder identification data and associating that data with a transaction amount, an issuer server maintained by an issuer of the transaction cards having cardholder data including a portable communications device number a user has designated and for evaluating transactions based upon the cardholder data and the transaction amount, and a data control center connected between a remote terminal means and the issuer, a method for generating an authorization record reflecting user authorization, the method comprising:

forwarding the cardholder identification data and transaction amount to the data control center;

forwarding the transaction amount and a unique identification code from the data control center to the issuer server;

transmitting a request to the portable communications device number based upon the transaction amount and an identity of a merchant;

creating an authorization record including information relative to the transmitted request in association with the unique identification code to create an authorization record; and forwarding the authorization record to the data control center to effect authorization of the transaction.

16. The method of claim 15 wherein: creating an authorization record including information relative to the transmitted request includes:

transmitting instructions to allow the user to indicate approval of the transaction;

receiving approval of the transaction; and configuring the authorization record to reflect the receiving of approval of the transaction.

17. The method of claim 16, wherein the transmitting of the instructions generates a display of the transaction amount and the identity of the merchant.

18. The method of claim 15, wherein the transmitting a request to the portable communications number is selectively transmitting the request based upon a user profile.

19. The method of claim 18, wherein the user may edit the user profile by adding event for transmitting the request to the user profile.

20. The method of claim 19, wherein the user may edit the user profile by means of an active page interface.

* * * * *